2,754,346

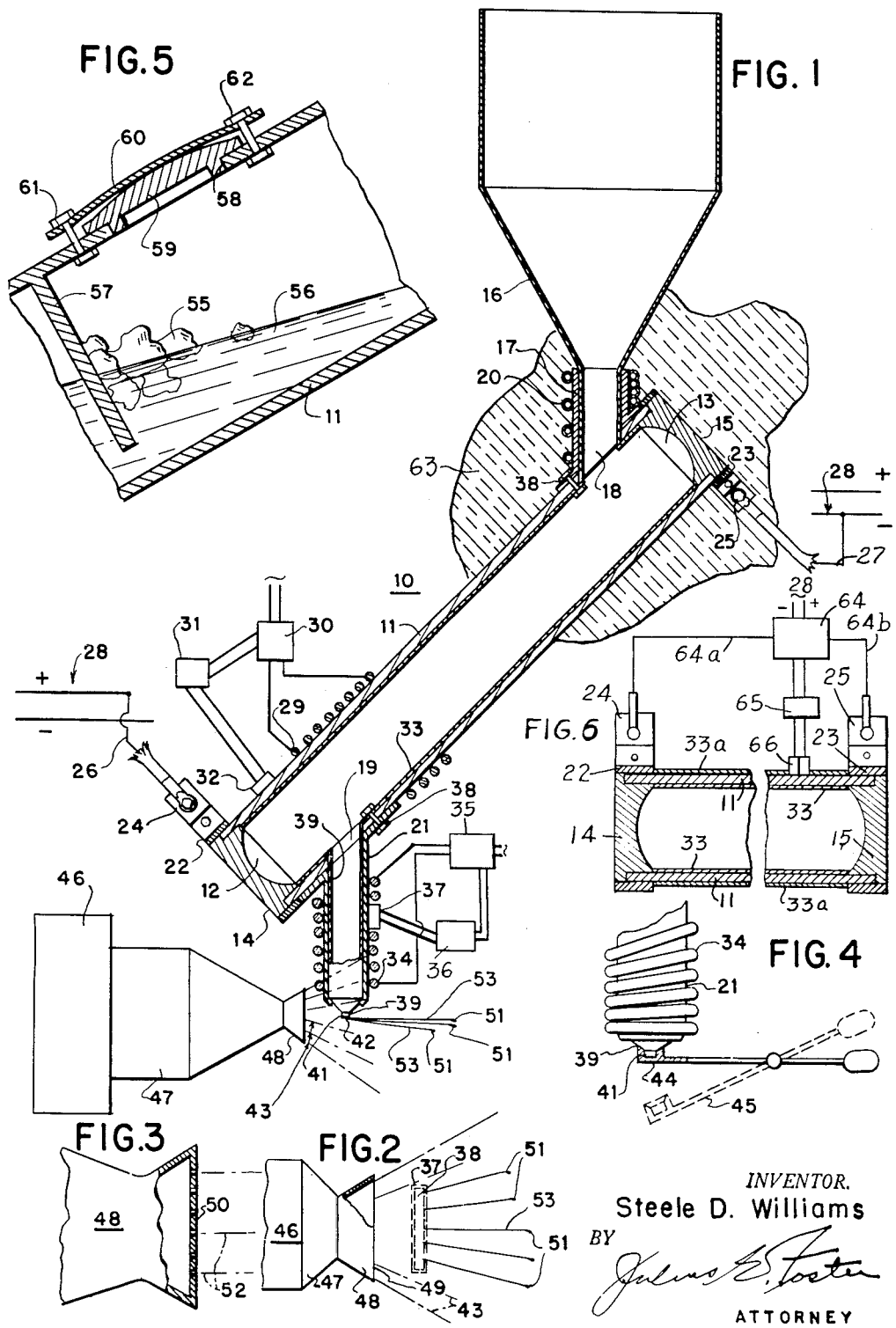
July 10, 1956
S. D. WILLIAMS
2,754,346
GLASS MELTING FURNACE
Filed Aug. 8, 1952
INVENTOR.
Steele D. Williams
BY
ATTORNEY United States Patent Office 2,754,346
Patented July 10, 1956

GLASS MELTING FURNACE

Steele D. Williams, Avalon, Pa.

Application August 8, 1952, Serial No. 303,314

8 Claims. (Cl. 13—5)

This invention relates to electric furnaces for melting glass batch material and for refining the resultant glass, and to furnaces primarily employed in the production of fiber glass.

An object of the invention is to provide a high temperature electric furnace having a construction and operation suitable for general applications, but particularly applicable to the continuous melting of siliceous materials and mixtures to form the stream of highly fluid molten glass needed for the formation of the glass fibers.

The furnace forming an embodiment of the present invention is intended to be employed in connection with apparatus for forming fiber glass and is designed and constructed for that purpose. It is illustrated in connection with diagrammatically disclosed apparatus for converting molten glass into fiber glass as it issues from the glass delivery aperture or orifice of the apparatus.

The furnace per se includes a refractory tubular member formed of materials such as silicon carbide, which is capable of conducting electricity but which, in doing so, serves as a high resistance heating element. The interior of the tubular member constitutes the melting and refining chamber of the furnace. The tubular member is closed at each end by a refractory plug and is provided with a protective coating on its inner and outer surfaces. Heating current is delivered to the member by spaced electrodes, each of which is shown in the form of an encircling band, surrounding and in electrical contact with the tubular member. One electrode is shown located at one end of the member and the other is located at the other end thereof. Heating current is delivered to the tubular member through the two electrodes.

In the drawings, the tubular member is shown inclined to the horizontal and a batch delivery conduit is located adjacent its elevated end and is arranged to deliver batch forming material to the interior thereof. A glass discharge conduit is located adjacent the lower end of the tubular member and on the lower side thereof. It communicates with the interior of the member and terminates in a discharge orifice which, during a glass melting operation, is normally submerged by molten glass.

In order to prevent caking of batch material delivered to the melting chamber of the furnace, the delivery conduit is cooled. In the illustrated embodiment this is accomplished by a cooling coil. For the purpose of supplementing the heat resulting from the delivery of heating current to the tubular member, I employ an induction coil which surrounds the tubular member adjacent the discharge conduit. A second induction coil is shown as surrounding the discharge conduit and is employed for delivering heat to molten glass leaving the tubular member and moving toward the glass delivery orifice.

In the drawings:

Fig. 1 is a schematic view of the general system, illustrating also a vertical section of the electric furnace to show the general details of its construction;

Fig. 2 is a schematic plan view of the mouth of the outlet spout to show its width and the preferred wider mouth of the steam nozzle;

Fig. 3 is a partial sectional view of a modified steam nozzle having a front wall with a large number of perforations to form many steam jets;

Fig. 4 is a schematic view of a pivoted arm arrangement for operating a cap for closing or opening the mouth of the outlet spout; and Fig. 5 is a schematic view of a modified form of the electric furnace, shown provided with a barrier to prevent unmelted lumps of slag from moving to the outlet end of the furnace.

Fig. 6 is a diagrammatic view of a portion of the furnace structure and illustrates a control system such as may be employed for controlling the delivery of heating current to the tubular shell enclosing the combustion chamber of the furnace.

As shown in Fig. 1 of the drawings the glass required for the formation of the structural glass fibers is formed in an electric furnace 10, comprising a main tubular body or shell 11 open at both ends 12 and 13 and provided with closure plugs 14 and 15 at those respective ends. The furnace body may normally be disposed horizontally for general applications, but for the operation described herein, the furnace body is disposed in inclined position, in order to permit gravity feed of raw materials from a hopper 16 into the furnace body 11 through an inlet conduit 17 communicating with inlet port 18 in the sidewall of the body 11 near the upper end 13 of the furnace body 11.

The lower end of the furnace operates as the high temperature end, and it is provided with an exit port 19 and an outlet conduit or spout 21.

The siliceous raw material for forming the glass is dumped into the hopper 16, from which the raw material normally feeds into the electric furnace gradually and progressively, as the charge in the furnace is heated and melted and moved through the furnace by gravity to the outlet port 19 from which it exits as liquid glass.

The two ends of the furnace body 11 are provided with end caps or straps 22 and 23, which serve as electric terminals to receive cable terminals 24 and 25 that are connected to or may be connected to electric cable conductors 26 and 27 for connection to an external supply circuit 28. When so connected, the electric furnace is a resistor element, and becomes heated by the conduction current through the furnace body 11.

The siliceous material introduced into the electric furnace from the hopper 16 is preferably kept at a temperature low enough to prevent caking of the material at the inlet port 18. For that purpose the inlet conduit 17 and the furnace area adjacent to the inlet port 18 may be cooled by a suitable cooling system, such as a coiled pipe 20 carrying cooling water and suitably disposed around the inlet conduit 17 for proper heat exchange between the conduit 17 and the cooling coil 20.

The furnace body 11 will normally be heated by the conduction current to the elevated temperature necessary to melt the siliceous charge therein to form a bath of molten glass. The furnace body 11 is made of silicon carbide to provide the refractory and current conducting character necessary to enable it to operate at such high temperature and to have the high resistance to enable it to serve as a resistive heating element. In order to protect the silicon carbide body from burning at the high temperature necessarily generated during operation, the entire inner and outer surfaces, as well as the exposed edge surfaces of the orifices or ports, are covered with a suitable refractory material, such as a layer 33 of a zircon compound, or of a mixture of zircon and alumina, or a thin liner of tungsten.

The current to and through the furnace shell body 11 is controlled by a suitable temperature detecting and control system, which provides for the development of a bath temperature of about 2300 degrees F. At the lower end of the furnace, adjacent to outlet port 19, the temperature of the bath is raised to a still higher temperature, in the range of 2900 to 3100 degrees F. by an induction heating coil 29, disposed around the lower end of the furnace body 11. That induction heating coil 29 is energized from a suitable source such as an induction generator 30, which, in turn, is controlled by a temperature regulator 31 through a temperature-responsive device 32 to regulate the induction heating coil to maintain the temperature of the bath near the outlet port 19 within the range indicated.

At that temperature the glass moving to the outlet is relatively fluid. However, in order to establish maximum fluidity of the flowing glass, to a condition at which the glass is liquid almost like water, an additional or superheat induction coil system 34 is disposed around the outlet conduit or spout 21 to pump additional heat into the stream of glass by induction; to raise the glass temperature to about 3300 degrees F. as it flows through the outlet conduit 21. The induction coil 34 is also provided with a supply source 35 that is controlled by a regulator 36 according to the temperature indicated by a suitable temperature-responsive device 37, all of which are indicated schematically.

The inlet conduit 17 and the outlet conduit or spout 21 particularly are preferably made of a high-temperature refractory metal, for example, tungsten. The two conduits are arranged to be suitably mechanically anchored to the furnace body 11 at the respective port openings 18 and 19. The anchoring means may consist of tungsten bolts and anchoring nuts 38. The outlet conduit or spout 21 may be made of the same refractory material as used for the furnace body, with the same protective layer of zircon, or of a mixture of zircon with either alumina or berylia or both. The outlet spout 21 may then be provided with a liner 39 of a high-temperature refractory metal, such as tungsten. In that case, as illustrated, the liner 39 may be shaped at its lower end to embody a thin wide mouth or opening 41 of predetermined sectional area and shape, so the flowing stream 42 of liquid glass may be confined to a fixed area with a very thin wide section, to permit maximum area of engagement of the high-velocity superheated steam 43 against the side wall surface of the glass.

A suitable cap or closure 44 separately shown for simplicity in Fig. 4 may be provided over the mouth 41 of the outlet liner 39, to prevent the flow of the glass from the furnace until desired. The cap is arranged to be moved to open or to closed position by any suitable means, here shown as a simple pivoted lever 45.

In order to provide the high-temperature superheated steam required for the method of operation involved here, a large steam generator 46 is connected to supply a continuous stream of high-temperature high pressure superheated steam to a system 47 indicated, for simplicity, merely as the back end connection to a high-velocity nozzle 48.

The nozzle may be provided with the usual open mouth 49, or with a perforated facing or cover 50. In the case of the full open-mouth nozzle 48, the entire stream of high-pressure high-velocity superheated steam will impinge on the side of the sheet or ribbon 42 of flowing glass and will break the glass up into small globules or charges 51. In the case of the perforated cover or cap 50 for the nozzle, the high-velocity steam will be broken up into a large number of high velocity jets 52.

In either case the small charges or globules 50 of glass that are separated from the flowing glass ribbon or sheet 42 are blown at high velocity by the steam, and, as thus entrained, the globules 51 are blown to form streamers or tails 53 that constitute the desired glass fibers. These fibers 53 are then permitted to continue their movement through air at ambient temperatures and are consequently cooled and then permitted to collect in a suitable container.

As indicated in Figs. 1 and 2, the steam nozzle is disposed so the steam jet area will cover and entrain the glass stream where the stream leaves the spout. The maximum effect of the steam jet force is thus assured of the glass stream.

The furnace as a whole is ordinarily jacketed with suitable insulating material, such as a magnesium oxide-silicate wool 63.

The furnace may be used in horizontal position, or inclined as shown. In either case, the charge of raw materials may be supplied through the inlet conduit. Where batch operation is employed, for a short run, for example, the furnace may be readily cleared of unmelted chunks of raw material.

For continuous operation, the furnace tube 11 may be modified, as in Fig. 5 to include a skimmer apron so as to prevent such unmelted chunks from moving to the discharge end of the furnace. As shown in Fig. 5, the unmelted chunks 55 would float on the top of the molten or semimolten bath 56 and would be stopped by the skimmer apron 57. Access to the tube to remove such unmelted masses may be made available through a hand-hole 58 large enough for suitable tongs or equivalent tools. A cap disc 59, of refractory material with a protective layer, as described for the tube body 11, closes the hand-hole 58 under the pressure of a spring-bar 60 held at both ends by bolts 61 and 62 anchored on the tube body 11.

As indicated above for the high temperatures desired in this process, the furnace materials must withstand those high operating temperatures and also have high electrical resistance. A silicon carbide tube meets these requirements, and is commercially available as the materials called "Carbofrax," and "Globar." Such a tube is then modified for the use herein, by coating the entire surface with a high temperature refractory, such as zircon or a zircon mix including, for example, also silica and alumina. The coating is applied to the tube by fusing the zircon or zircon mix as a layer onto the entire surface of the furnace tube 11 to cover the entire tube.

In Fig. 6 I have diagrammatically illustrated a portion of the furnace structure including the tubular shell 11 and enclosing coating 33 and 33a for the shell, which coating is a high temperature refractory formed of zircon or a mixture made up of zircon, silica and alumina. The coating is for the purpose of protecting the tubular shell 11 against corrosion under high temperature conditions encountered. As shown in Fig. 6, heating current may be delivered to the silicon carbide tubular shell 11 by the electrodes 24 and 25 which engage metallic bands 22 and 23 and receive current from a current source 64 through lines 64a and 64b. The source of current 64 is controlled by a current regulator 65 in response to a temperature indicating and responsive device 66, all of which is diagrammatically illustrated.

While I have illustrated and described but one form of the furnace structure constituting an embodiment of my invention, it will be understood that various changes in structural details and in materials employed may be made without departing from the spirit and scope of the invention as defined by the appended claims.

What is claimed is:

1. An electric furnace comprising a refractory tube having an upper end and a lower end, with an inlet port near the upper end and an outlet port near the lower end; a refractory terminal block closing each end of the tube; an electrical terminal at each end of the tube for connection to an external electrical circuit to permit a heating current to traverse the tube; means for keeping the inlet port and the port region cool enough to prevent caking of the supply material to be fed into the furnace; first induction heating means for additionally heating the contents of the tube as they approach and move to the outlet port; and second heating means at the outlet port for additionally heating the material in passage through the outlet port.

2. An electric furnace constructed as in claim 1, and adapted to be mounted in inclined position and having its inlet port disposed to receive raw material by gravity feed into said inlet port, and to aid the material, when heated, to move to and through the outlet port; a hopper disposed to deliver raw material into the inlet port; the cooling means being disposed between the hopper and the furnace and serving to keep the raw material and the inlet region of the furnace cool enough to prevent caking that might close the inlet port; an outlet spout; and said first and the second induction heating means serving to establish a condition of mobile fluidity in the material mass adjacent to the outlet port and a condition of increased and extreme fluidity in the mobile fluid material as it moves through the outlet spout.

3. An electric furnace for melting glass batch material, comprising a refractory tubular member inclined to the horizontal and constituting an electric resistance element; means adjacent the elevated end thereof for delivering batch material into the interior of said tubular member; a delivery spout adjacent the other end of said member and communicating with the interior thereof and terminating in a discharge orifice; two spaced electrodes in electrical contact with said member for delivering heating current to said member; means for connecting said electrodes to a source of electric current; and means located adjacent the lower end of said member for delivering supplementing heat to the interior of said member and additional means for delivering supplementing heat to said delivery spout.

4. An electric melting furnace for glass batch material, comprising a refractory tubular member inclined to the horizontal and constituting an electric resistance element; means communicating with the elevated end of said member for delivering batch material to the interior thereof; a delivery spout communicating with the interior of said member adjacent the lower end thereof; two spaced electrodes in electrical contact with said member for delivering heating current thereto; means for connecting said electrodes to a source of electric current; an induction coil surrounding said member and located adjacent the lower end thereof; means for delivering electric current to said coil; a separate induction coil surrounding said delivery spout; and means for delivering electric current to said second coil.

5. A melting furnace for glass batch material, comprising a refractory tubular member constituting an electrical resistance element; refractory closures for each end of said member; a delivery conduit communicating with the interior of said member adjacent one end thereof for delivering batch material into said member; a discharge conduit communicating with the interior of said member adjacent the other end thereof for discharging molten glass from said member; two spaced electrodes, each surrounding said member and in electrical contact therewith for delivering heating current thereto; an induction coil surrounding said member and located adjacent the discharge conduit end thereof; a second induction coil surrounding said discharge conduit; separate means for delivering electric current to each such coil and said electrodes; and means for cooling said delivery conduit.

6. A melting and refining furnace for glass batch material, comprising a refractory tubular member constituting an electrical resistance element and composed of silicon carbide having a protective coating on its inner surface; a refractory closure for each end of said member; a batch delivery conduit communicating with the interior of said member adjacent one end thereof for delivering batch material into said member; a discharge conduit communicating with the interior of said member adjacent the other end thereof and located on the lower side of said member for discharging molten glass therefrom; two band shaped electrodes located in spaced relationship along said member, each surrounding said member and located in electrical contact therewith for delivering heating current thereto; means connecting said electrodes to a source of electric current; a skimmer apron located within said member intermediate said conduits and projecting downwardly from the interior surface thereof to a point below the surface of the molten glass within said chamber; means for connecting said electrodes to a source of electric current; means for delivering supplementing heat to said member adjacent to said discharge conduit; and means for separately heating molten glass within said discharge conduit.

7. A melting and refining furnace for glass batch material, comprising a refractory tubular member formed of silicon carbide and constituting an electrical resistance element; separate protective coatings on the inner and outer surfaces of said member; a refractory closure for each end of said member; a batch delivery conduit communicating with the interior of said member adjacent one end thereof; a glass discharge conduit communicating with the interior of said member adjacent the other end thereof; electric conductors located in spaced relationship along said member for delivering heating current thereto; means for cooling said batch delivery conduit; an induction coil surrounding said member and said external coating and located intermediate said conduits but adjacent said glass discharge conduit; and a second induction coil surrounding said glass discharge conduit; and means for delivering current to each of said coils.

8. An electric furnace comprising a refractory tubular element of silicon carbide having a longitudinal passage therethrough with closure elements of refractory material at both ends of the tubular element; an electrode secured to each end of the tubular element to provide means for connecting an external electric circuit to the tubular element as a conductor to be heated; a first refractory conduit extending through the wall of the tubular element near one end of said element to serve as an inlet conduit for the furnace; a second refractory conduit extending through the wall of said tubular element near the other end of said element to serve as an outlet conduit to discharge the materials from the furnace; means for controlling the temperature of the inlet conduit and the adjoining area of the furnace wall; and induction heating means for supplementing the heating of the tubular element adjacent the outlet conduit to further elevate the temperature of the heated material exiting through the outlet conduit.

References Cited in the file of this patent

UNITED STATES PATENTS

| | | |
|---|---|---|
| Re. 6,894 | Player | Feb. 1, 1876 |
| Re. 6,895 | Player | Feb. 1, 1876 |
| 292,921 | Kitson | Feb. 5, 1884 |
| 328,226 | Kennedy et al. | Oct. 13, 1885 |
| 388,645 | Diehl | Aug. 28, 1888 |
| 652,640 | Potter | June 26, 1900 |
| 812,801 | Ober | Feb. 13, 1906 |
| 920,143 | Hughes | May 4, 1909 |
| 1,641,764 | Keenan | Sept. 6, 1927 |
| 1,679,251 | Lindsay | July 31, 1928 |
| 1,799,102 | Kelley | Mar. 31, 1931 |
| 2,122,241 | Arnold | June 28, 1938 |
| 2,186,718 | Ferguson | Jan. 9, 1940 |
| 2,308,857 | Bowes | Jan. 19, 1943 |
| 2,335,463 | Steinbock | Nov. 30, 1943 |
| 2,356,237 | Geller | Aug. 22, 1944 |
| 2,485,851 | Stevens | Oct. 25, 1949 |
| 2,552,124 | Tallman | May 8, 1951 |
| 2,585,761 | Gallois | Feb. 12, 1952 |
| 2,600,490 | De Voe | June 17, 1952 |
| 2,680,771 | Kistler | June 8, 1954 |